W. NUGENT.
WATER-FILTERS.
No. 193,775. Patented July 31, 1877.
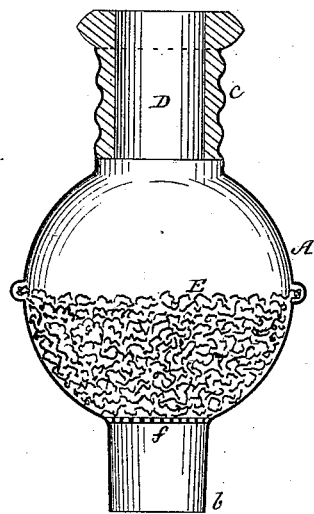
Witnesses:
Arthur McSmit
Francis Carroll
Inventor:
William Nugent,
By his atty.
John S. Thornton

UNITED STATES PATENT OFFICE.

WILLIAM NUGENT, OF NEW YORK, N. Y.

IMPROVEMENT IN WATER-FILTERS.

Specification forming part of Letters Patent No. 193,775, dated July 31, 1877; application filed February 24, 1877.

*To all whom it may concern:*

Be it known that I, WILLIAM NUGENT, of the city of New York, in the county and State of New York, have invented an Improved Water-Filter, of which the following is a full, clear, and exact description, reference being had to the accompanying drawings, making a part of this specification.

The object of my invention is to provide a water-filter for use in private residences and other places, which shall be extremely simple and inexpensive in its construction; which may be very readily applied to, and removed from, the hydrant or other source of supply; and which may with equal facility be packed either tightly or loosely with the filtering material, and admit of the said filtering material being removed therefrom readily and easily, and without requiring the exercise of any skill in order to detach and readjust the parts.

My improvement consists in making the main body of the filter of sheet metal, struck up in two parts, and seamed together, having suitable inlet and outlet tubes, in the former of which is inserted a bushing of rubber or similar material, by means of which the filter may be easily and tightly attached to the hydrant or supply-pipe, and which is detachable so that access to the interior may be readily had for the purpose of removing the filtering material when it needs cleansing and the removing therefrom of the sediments or impurities, the several parts being constructed and arranged as hereinafter set forth.

The accompanying drawing represents a vertical section of my improved filter taken through its center.

A represents the body of the filter, which may be of any suitable metal, and of convenient form, the two parts being struck up from sheet metal by means of dies, and seamed together. *b* is the outlet at the lower side of the former, and *c* the neck or inlet. Upon the neck or inlet *c* are provided spiral corrugations to receive and hold a bushing, D, of rubber or other suitable material, which is inserted in the said neck or inlet.

The object of this elastic bushing D is twofold, namely: to admit of the filter being easily and firmly attached to the hydrant or discharge-pipe without requiring any further adjustment than to simply slip it onto the same; and also to permit ready access to the interior of the filter, for the purpose of removing the sponge E or other filtering material that may be used therein, when the same requires cleansing.

On the outer side of this rubber bushing D are formed indentations corresponding to the corrugations on the neck *c* of the filter, so that the former may be screwed into the latter and held firmly therein. *f* is a perforated plate to keep the filtering material from entering the outlet *b*, which said filtering material may be sponge or other suitable substance.

It will be obvious that this sponge may be packed in the body of the filter either loosely or compactly, as may be desired, and that by simply removing the bushing D it may be taken out and replaced with very little trouble. It will also be seen that by means of this elastic bushing the filter may be very easily attached and detached, and made to fit any size of pipe; and that, by reason of the construction and arrangement of parts, as above described, I am enabled to supply a very efficient and inexpensive filter, which requires, comparatively, neither trouble nor skill in its management.

What I claim as my invention is—

As a new article of manufacture, the water-filter herein described, consisting of the sheet-metal case A, struck up as described, having the inlet *c* provided with spiral corrugations, and the outlet *b*, the spirally-corrugated elastic bushing D, the perforated bottom plate *f*, and the sponge or other filtering material E, substantially as and for the purpose set forth.

WILLIAM NUGENT.

Witnesses:
JOHN S. THORNTON,
FRANCIS M. SCOTT.